US010750036B1

(12) United States Patent
de Beus

(10) Patent No.: US 10,750,036 B1
(45) Date of Patent: Aug. 18, 2020

(54) RAPID WORKFLOW DESIGN USING MACHINE LEARNING

(71) Applicant: KYOCERA Document Solutions, Inc., Osaka (JP)

(72) Inventor: Eric de Beus, Redondo Beach, CA (US)

(73) Assignee: KYOCERA Document Solutions, Inc., Osaka (JP)

(*) Notice: Subject to any disclaimer, the term of this patent is extended or adjusted under 35 U.S.C. 154(b) by 0 days.

(21) Appl. No.: 16/552,903

(22) Filed: Aug. 27, 2019

(51) Int. Cl.
*H04N 1/00* (2006.01)
*G06N 3/04* (2006.01)
*G06N 3/08* (2006.01)
*G06K 9/20* (2006.01)
*H04N 1/32* (2006.01)
*H04N 1/387* (2006.01)
*G06K 9/62* (2006.01)

(52) U.S. Cl.
CPC ....... *H04N 1/00395* (2013.01); *G06K 9/2054* (2013.01); *G06N 3/04* (2013.01); *G06N 3/08* (2013.01); *H04N 1/00366* (2013.01); *H04N 1/32042* (2013.01); *H04N 1/3877* (2013.01); *G06K 9/6256* (2013.01)

(58) Field of Classification Search
CPC ........... H04N 1/00395; H04N 1/32042; H04N 1/3877; H04N 1/00366; G06N 3/04; G06N 3/08; G06N 20/00; G06K 9/2054; G06K 9/6256; G06F 3/1208; G06F 3/0454; G06T 5/002; G06T 5/003; G06T 5/40
USPC ............................................... 358/1.13, 1.15
See application file for complete search history.

(56) References Cited

U.S. PATENT DOCUMENTS

| | | | |
|---|---|---|---|
| 10,032,072 B1* | 7/2018 | Tran | H04N 5/23229 |
| 2017/0032222 A1* | 2/2017 | Sharma | G06K 9/4619 |
| 2017/0317983 A1* | 11/2017 | Kompalli | G06F 21/6209 |
| 2018/0293429 A1* | 10/2018 | Wechsler | G06N 3/02 |

* cited by examiner

*Primary Examiner* — Allen H Nguyen
(74) *Attorney, Agent, or Firm* — Rowan TELS LLC

(57) ABSTRACT

A system and method for rapid workflow design utilizing machine learning includes a scanner, a convolutional neural network, a converter, a graph generator, and a controller. The scanner may convert a paper copy of a process flow into a pixelated image. The convolutional neural network is configured to segment the pixelated image into objects including at least one of an action, a decision, a connector, or a combination thereof. The converter is configured to transform the objects into a connectivity matrix. The graph generator is configured to transform the connectivity matrix into a rectilinear graph. The controller is configured to identify automated actions, semi-automatic actions, and actions requiring operator input from graphical icons provided on the paper copy and, based on the rectilinear graph, to serialize the automated actions, the semi-automatic actions, and the actions requiring operator input as control commands to a printing system.

20 Claims, 11 Drawing Sheets

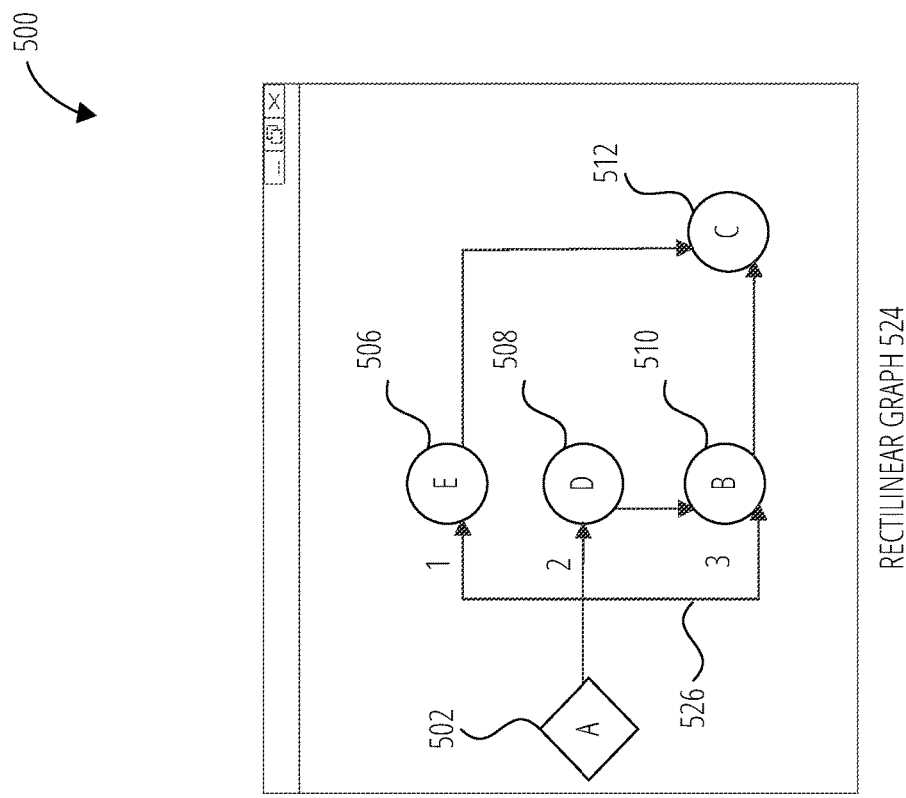
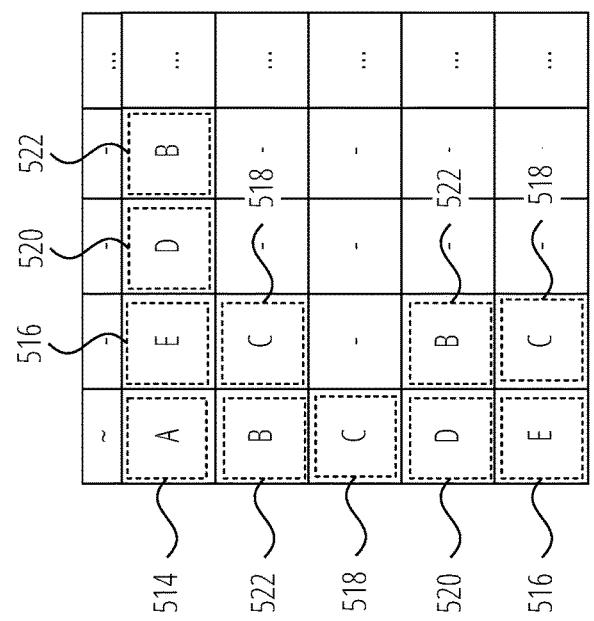
FIG. 5

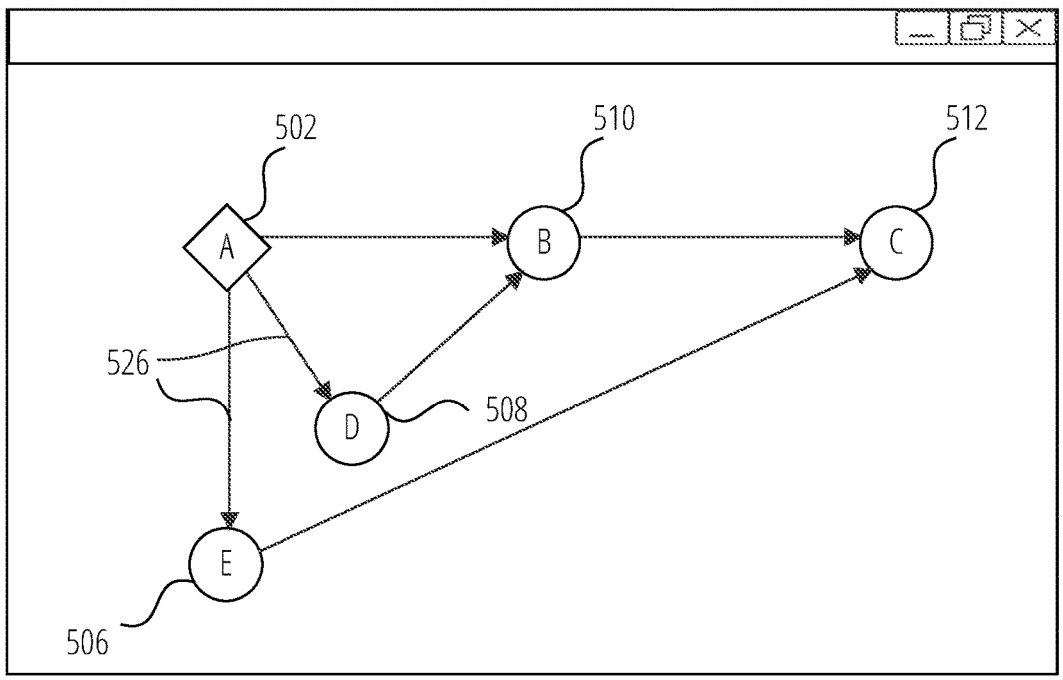
Alternate Rectilinear Graph 604
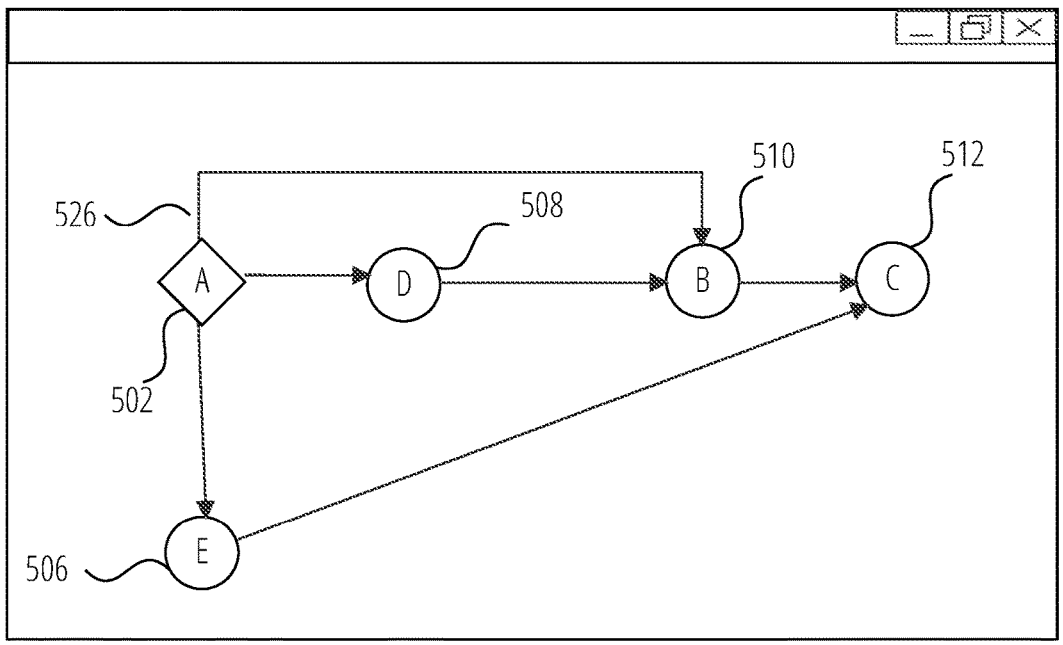
Alternate Rectilinear Graph 602
FIG. 6

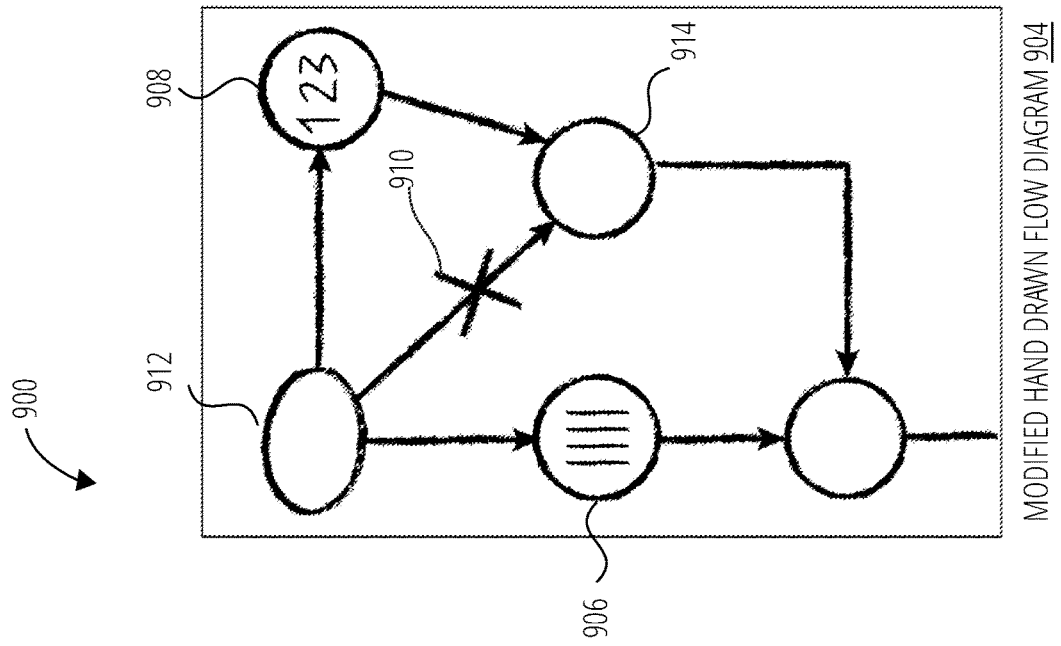
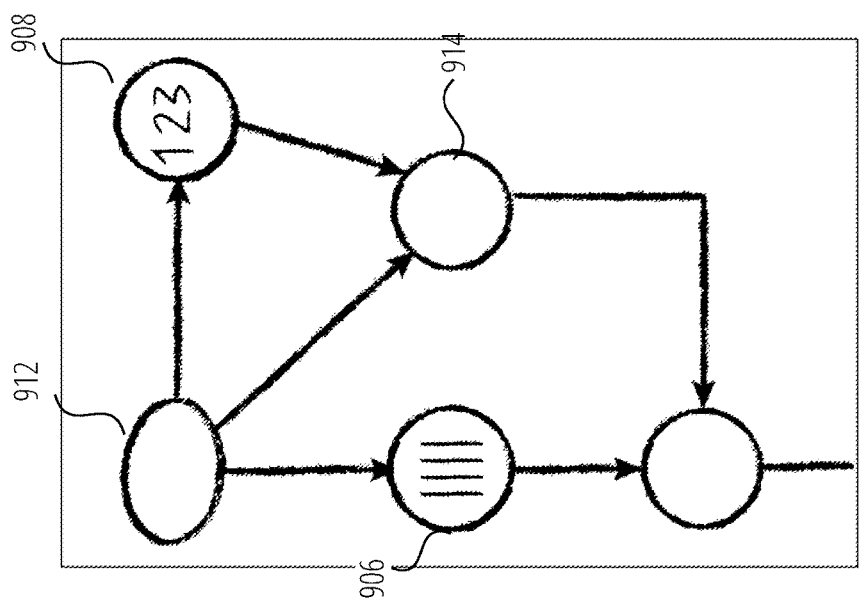
FIG. 9

RAPID WORKFLOW DESIGN USING MACHINE LEARNING

BACKGROUND

Flow charts and workflow diagrams are commonly used to design or analyze automated processes. In some cases (e.g., automated prepress systems, robot control systems) the diagram itself is the finished workflow. A workflow diagram may be drawn by hand, in which case some form of data entry is required to convert it to machine-readable form. This may involve redrawing the diagram and reentering the data if there are any substantial changes. There are systems that allow a diagram to be drawn on a computer, typically by dragging and dropping shapes (representing workflow or flow chart nodes) into place, and then connecting them by dragging lines from one shape to another, but these systems can be cumbersome to use.

BRIEF SUMMARY

A system for rapid workflow design utilizing machine learning may include a scanner, a convolutional neural network (CNN), a converter, a graph generator, and a controller. The scanner may convert a paper copy of a process flow into a pixelated image. The convolutional neural network may be configured to segment the pixelated image into objects including at least one of an action, a decision, a connector, and combinations thereof. The converter may transform the objects into a connectivity matrix. The graph generator may transform the connectivity matrix into a rectilinear graph. The controller may identify automated actions, semi-automatic actions, and actions requiring operator input from graphical icons provided on the paper copy and, based on the rectilinear graph, to serialize the automated actions, the semi-automatic actions, and the actions requiring operator input as control commands to a printing system.

A method of rapid workflow design utilizing machine learning involves converting a paper copy of a process flow into a pixelated image by using a scanner. The method may then segment the pixelated image into objects that may include at least one of an action, a decision, a connector, or a combination thereof, by using a convolutional neural network. The method may then transform the objects into a connectivity matrix using a converter. The method may then transform the connectivity matrix into a rectilinear graph by using a graph generator. The method may the operate a controller to identify automated actions, semi-automatic actions, and actions requiring operator input, from graphical icons provided on the paper copy and, based on the rectilinear graph to serialize automated actions, semi-automatic actions, actions requiring operator input, and combinations thereof as control commands to a printing system.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 5 illustrates CNN outputs 500 in accordance with one embodiment.

FIG. 6 illustrates alternative outputs 600 in accordance with one embodiment.

FIG. 9 illustrates a flow diagrams 900 in accordance with one embodiment.

DETAILED DESCRIPTION

Figure 1:
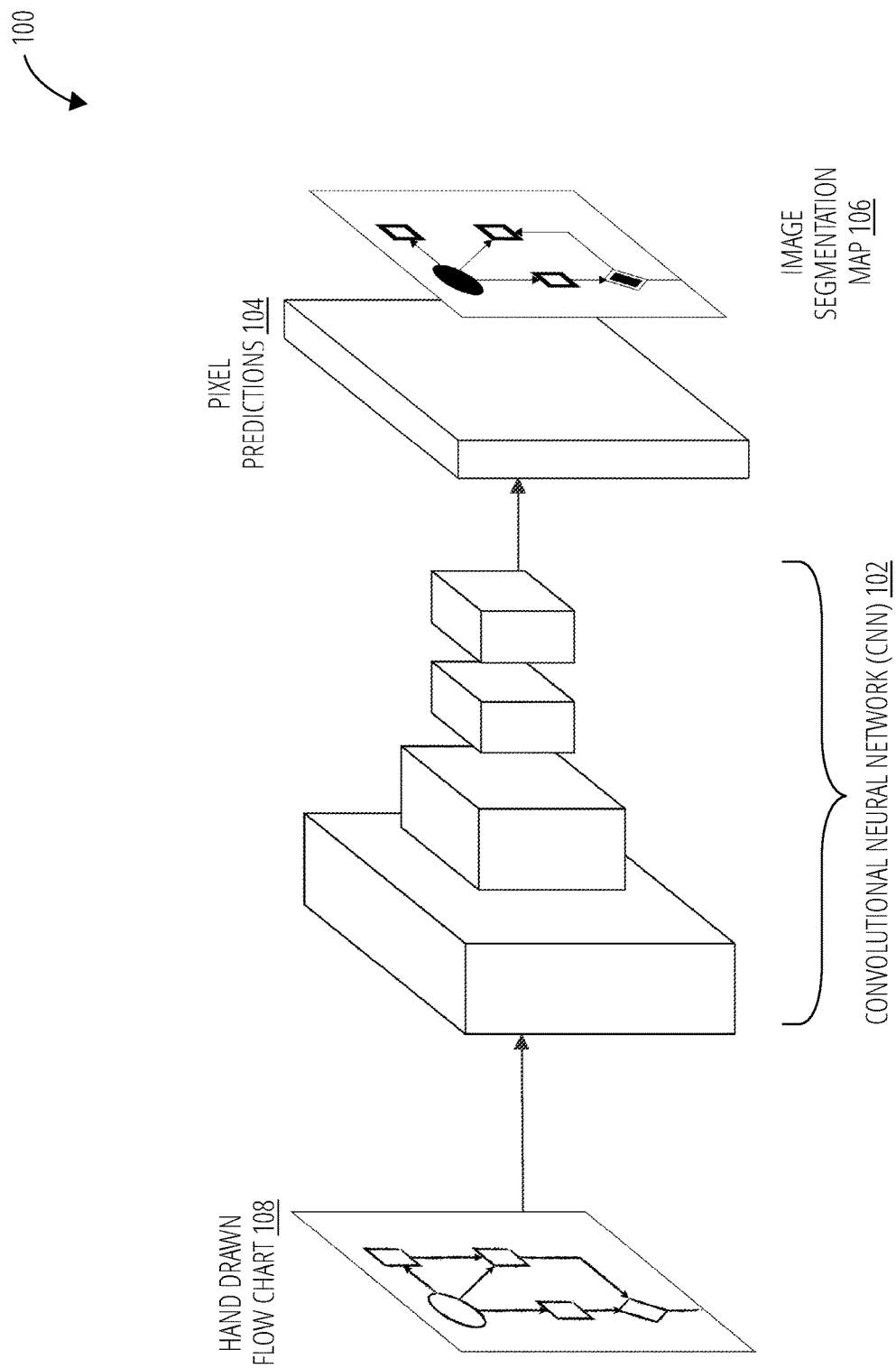
FIG. 1 illustrates a machine learning system 100 in accordance with one embodiment.

"Action" refers to a procedure or activity that may be performed before, during, or after a process. An action may be an automated action, semi-automatic action, or an action requiring operator input, but is not limited thereto.

"Actions requiring operator input" refers to Process flow actions that require input from an operator.

"Automated actions" refers to Process flow actions that do not require operator input.

"Connectivity matrix" refers to a matrix that represents a feature map in a table format. Objects that are part of the feature map may be represented by nodes in a flow chart or workflow diagram. Nodes may include start nodes, action nodes, or decision nodes. The connectivity matrix shows the nodes and connections between the nodes in a table format.

"Connector" refers to a line in a process flow that connects actions, processes, or decisions.

"Control commands" refers to commands used to control a printing system while the printing system is performing at least a portion of a printing process.

"Controller" refers to logic configured to identify actions from graphical icons on a paper copy of a process flow and based on a rectilinear graph, serialize the actions as control commands to a printing system.

"Converter" refers to logic used to transform objects into a connectivity matrix.

"Convolutional neural network" refers to a neural network including an input and an output layer, as well as multiple hidden layers. The hidden layers include a series of convolutional layers that convolve with a multiplication or other dot product.

"Decision" refers to a point in a process flow where more than one path is available to continue the process flow.

"Graph generator" refers to logic configured to linearize a connectivity matrix into a diagram showing nodes and connections between the nodes. The lines may include arrows to indicate an order of operation in the process flow or workflow.

"Graphical icons" refers to symbols added by an operator to a paper copy of a process flow diagram. The symbols may represent different types of action nodes in the process flow, such as page-numbering, barcode, and imposition nodes, but are not limited thereto.

"Objects" refers to a feature in an image that may be identified using image segmentation, such as creating and analyzing a pixelated image. Objects may include nodes, lines, arrows, etc., but are not limited thereto.

"Operator" refers to a person who operates the systems disclosed herein and/or uses the systems. An operator may also be referred to as a user.

"Paper copy" refers to the physical medium on which a process flow is printed.

"Pixelated image" refers to the result of displaying a bitmap or a section of a bitmap at such a large size that individual pixels, small single-colored square display elements that comprise the bitmap, are visible.

"Printing system" refers to a system that is used to print items or print onto items, including but not limited to at least one of a scanner and a printer.

"Process flow" refers to a flow chart or workflow diagram used to analyze or design an automated process.

"Rectilinear graph" refers to a linearized display of a connectivity matrix. The connectivity matrix may be displayed in a left-to-right type of diagram with, for example, nodes and arrows. The rectilinear graph may be represented by a tree structure with parent nodes and child nodes.

"Semi-automatic actions" refers to Process flow that may require operator input for at least a portion of the action.

A system and method for rapid workflow design, utilizing a paper copy of a process flow, is disclosed. The system utilizes machine learning and includes a scanner, a convolutional neural network, a converter, a graph generator, and a controller. An operator/user creates a hand drawn process flow and scans the process flow into the system. The scanned paper copy is converted into a pixelated image. Next, the convolutional neural network segments the pixelated image into objects including at least one of an action, a decision, a connector, or a combination thereof. The converter then transforms the objects into a connectivity matrix. Next, the graph generator transforms the connectivity matrix into a rectilinear graph. The controller identifies automated actions, semi-automatic actions, and actions requiring operator input from graphical icons provided on the paper copy. Finally, based on the rectilinear graph, the controller serializes the automated actions, the semi-automatic actions, and the actions requiring operator input as control commands to a printing system.

In some configurations, the system may include a router to direct actions requiring operator input from the rectilinear graph to an operator console.

In some configurations, the system may include a feedback loop from the printing system to the scanner.

In some configurations of the system, the convolutional neural network may be further configured to recognize annotations on the paper copy to remove connectors.

In some configurations of the system, the annotations on the paper copy to remove the connectors may be at least one or more of an X, hatch lines, and cross-hatch lines through the connectors.

In some configurations of the system, the automated actions may include at least one or more of joining multiple documents into one document, ganging multiple documents into one document, rotating a page orientation, converting the page orientation, and de-speckling a scanned document.

In some configurations of the system, the actions requiring operator input may include at least one or more of adding a watermark, inserting blank sheets, adding a bar code, resizing pages, and cropping pages.

In some configurations of the system, the semi-automatic actions may include imposing multiple pages, color managing pages, adding page numbers, and pressmarking pages.

In some configurations of the system, the rectilinear graph may include a tree structure with parent nodes and child nodes, the tree structure grows from left to right, and when the nodes of the tree structure are initialized, their horizontal and vertical positions are set only if they have not been previously set.

In some configurations of the system, the node connectors of the rectilinear graph may include at least one or more of fork connectors to connect parent nodes to child nodes, straight connectors to connect adjacent child nodes, U-connectors to connect non-adjacent child nodes, and C-connectors to connect nodes requiring a loop-back connection.

A method of rapid workflow design utilizing machine learning involves converting a paper copy of a process flow into a pixelated image by using a scanner. The method may then segment the pixelated image into objects that may include at least one of an action, a decision, a connector, or a combination thereof, by using a convolutional neural network. The method may then transform the objects into a connectivity matrix using a converter. The method may then transform the connectivity matrix into a rectilinear graph by using a graph generator. The method may the operate a controller to identify at least one of an automated action, a semi-automatic action, an action requiring operator input, or a combination thereof, from graphical icons provided on the paper copy and, based on the rectilinear graph to serialize automated actions, semi-automatic actions, actions requiring operator input, and combinations thereof as control commands to a printing system.

In some configurations, the method may involve directing the actions requiring operator input from the rectilinear graph to an operator console by using a router.

In some configurations, the method may involve updating the scanner using a feedback loop from the printing system.

In some configurations, the method may involve configuring the convolutional neural network to recognize annotations on the paper copy to remove the connectors.

In some configurations of the method, the annotations on the paper copy to remove the connectors may be at least one or more of an X, hatch lines, and cross-hatch lines through the connectors.

In some configurations of the method, the automated actions may include at least one or more of joining multiple documents into one document, ganging multiple documents into one document, rotating a page orientation, converting the page orientation, and de-speckling a scanned document.

In some configurations of the method, the actions requiring operator input may include at least one or more of adding a watermark, inserting blank sheets, adding a bar code, resizing pages, and cropping pages.

In some configurations of the method, the semi-automatic actions may include imposing multiple pages, color managing pages, adding page numbers, and pressmarking pages.

In some configurations of the method, the rectilinear graph may include a tree structure with parent nodes and child nodes, the tree structure grows from left to right, and when the nodes of the tree structure are initialized, their horizontal and vertical positions are set only if they have not been previously set.

In some configurations of the method, the node connectors of the rectilinear graph may include at least one or more of fork connectors to connect parent nodes to child nodes, straight connectors to connect adjacent child nodes, U-connectors to connect non-adjacent child nodes, and C-connectors to connect nodes requiring a loop-back connection.

FIG. 1 illustrates a system 100 in accordance with one embodiment. The system 100 depicts an input image of a flow chart (hand drawn flow chart 108) passing through a fully convolutional neural network (CNN 102), resulting in a map of the probability of each pixel (pixel predictions 104) in the image belonging to an object of a certain class, and finally being converted to an image segmentation map 106, which identifies the objects and their locations. In the figure, the start node is a circle while action nodes are rectangles and decision nodes are diamonds.

In FIG. 1, the input diagram (hand drawn flow chart 108) is converted to an image segmentation map (image segmentation map 106) by way of the CNN 102. The resulting object map is analyzed and converted into a table that describes the nodes in the flow chart or workflow diagram, and their connections and transitions. If desired, the workflow may then be displayed in a linearized, left-to-right diagram.

In some configurations, the CNN 102 may utilize two (2) 256×256 convolutional layers, followed by one 128×128 max pooling layer, followed by two (2) 128×128 convolutional layers, followed by one (1) 64×64 max pooling layer, followed by three (3) 64×64 convolutional layers, followed by one (1) 32×32 max pooling layer, followed by three (3) 32×32 convolutional layers, followed by one (1) 16×16 max pooling layer, followed by three (3) 16×16 convolutional layers, followed by one (1) 8×8 max pooling layer, followed by one (1) 16×16 convolutional layer, followed by one (1) 16×16 unpooling layer, followed by three (3) 16×16 deconvolution layers, followed by one (1) 32×32 unpooling layer, followed by three (3) 32×32 deconvolution layers, followed by one (1) 64×64 unpooling layer, followed by three (3) 64×64 deconvolution layers, followed by one 128×128 unpooling layer, followed by two (2) 128×128 deconvolution layers, followed by one 256×256 unpooling layer, followed by two (2) 256×256 deconvolution layers, with each convolutional or deconvolution layer above immediately followed by a ReLU (rectified linear unit) nonlinearity layer.

Figure 2:
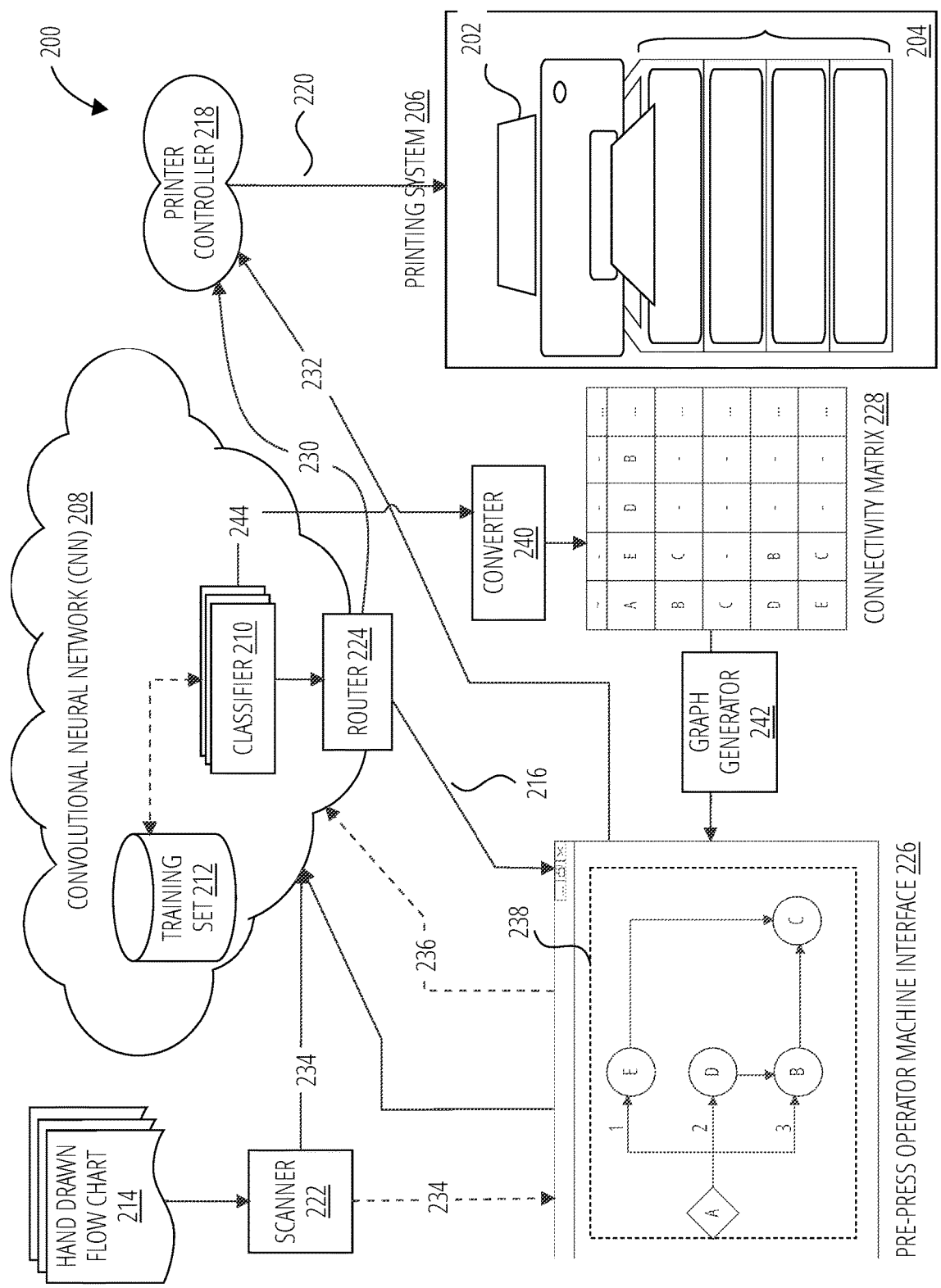
FIG. 2 illustrates a scanning and machine learning system 200 in accordance with one embodiment.

FIG. 2 illustrates a system 200 in accordance with one embodiment. The system 200 includes a scanner 222, a convolutional neural network (CNN 208), a pre-press operator machine interface 226, a converter 240, graph generator 242, and a printing system 206 comprising a printer controller and a printer 202 with one or more page stock bays 204. During operation of the system 200 may receive a paper copy of a process flow (hand drawn flow chart 214) that describes a workflow or description of pre-press operator actions for controlling the printer 202 and the page stock bays 204. A scanner 222 may convert the hand drawn flow chart 214 into a pixelated image 234 for the CNN 208. The CNN 208 may be configured to segment the pixelated image into objects 244 including actions, decisions, and connectors. The CNN 208 may comprise training set 212 data and a classifier 210.

The objects 244 may be provided to a converter 240 for generating a connectivity matrix 228. The connectivity matrix 228 may be utilized by the graph generator 242 to generate a rectilinear graph 238 displayable in an operator console (pre-press operator machine interface 226). A controller (printer controller 218) identifies automated actions (automated actions 230) and actions requiring operator input 216 from graphical icons provided on the hand drawn flow chart 214. The printer controller 218 may serialize the automated actions 230 and actions requiring operator input 216 as control commands 220 to the printing system 206, based on the rectilinear graph 238.

A router 224 may direct the actions requiring operator input 216 from the rectilinear graph 238 to the pre-press operator machine interface 226 (operator console). The actions requiring operator input 216 may be an action in the rectilinear graph 238. Following the input from the operator, the pre-press operator machine interface 226 may communicate an operator confirmed action 232 to the printer controller 218.

In some configurations, a feedback loop from the printing system to the scanner may be provided.

In some configurations, the pre-press operator machine interface 226 may display the pixelated image 234 instead of the generated rectilinear graph 238. A user or operator may make modifications to the pixelated image of the hand drawn flow chart 214 through the pre-press operator machine interface 226. These modifications may then be communicated to the CNN 208 as pixelated image markup 236.

In some configurations, the convolutional network may be further configured to recognize annotations on the paper copy to remove connectors. In this configuration, the scanner 222 communicates the pixelated image 234 of the annotations on the paper copy to remove connector hatch lines through the connectors.

Figure 3:
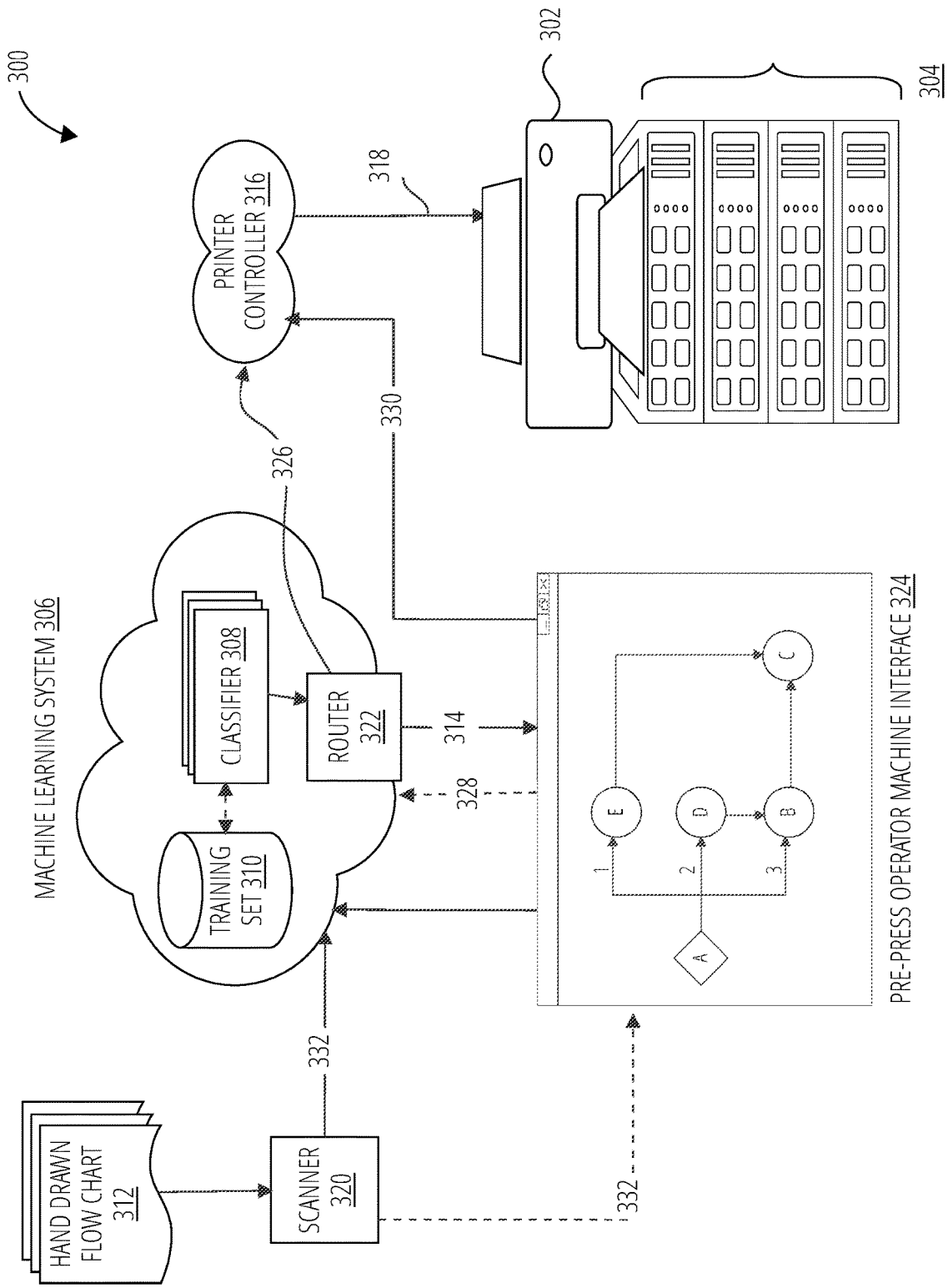
FIG. 3 illustrates a printing system 300 in accordance with one embodiment.

FIG. 3 illustrates a printing system 300 in accordance with one embodiment. The printing system 300 includes a printer 302 with one or more page stock bays 304, a machine learning system 306 comprising a classifier 308 and training set 310. The machine learning system 306 is responsive to a pre-press action monitor and to page parameters for a hand drawn flow chart 312 output from a page parameter extractor to generate a plurality of pre-press operator action predictions 314, which may be provided for operator review and confirmation on a pre-press operator machine interface 324 (also referred to herein as an operator console). Confirmed (or automated) pre-press operator actions (i.e., operator confirmed action 330 and automated actions 326) are sent to a printer controller 316 which applies control commands 318 for the pre-press operator actions to the printer 302. Other elements of the printing system 300 known in the art are omitted to simplify this description.

The printer 302, the machine learning system 306, the printer controller 316 and the pre-press operator machine interface 324 typically communicate over a network (not shown). The pre-press operator is provided a hand drawn flow chart 312 (e.g., Microsoft Word, Portable Document Format, HTML, etc.) assembled using a device such as a laptop or a desktop computer (for example). The hand drawn flow chart 312 may typically be assembled from one or more distinct electronic documents. For example, a professor may select one or more chapters from one or more textbooks to print for a specific course, scan the pages (if the books are not already digital), and concatenate the resulting digital files into the hand drawn flow chart 312. The professor may provide these chapters to the pre-press operator separately in paper or digital form or may provide the assembled hand drawn flow chart 312. Thus, the hand drawn flow chart 312 often includes multiple sections from diverse sources.

In some configurations, the hand drawn flow chart 312 may be received through a scanner 320 that converts the hand drawn flow chart 312 into a pixelated image 332 which may then be communicated to the machine learning system 306. In some configurations the pixelated image 332 of the hand drawn flow chart 312 is communicated to the pre-press operator machine interface 324 allowing the operator to view to make modifications and/or markups (markups 328) that may then be communicated back to the machine learning system 306.

The machine learning system 306 is utilized to predict pre-press operator actions and, in some cases, to automatically select an initial set of pre-press actions to apply for printing the hand drawn flow chart 312. In some embodiments, the machine learning system 306 is trained, at least initially, by a training set of data. The training set of data may comprise pairs of values. Each pair of values includes an input value and an output value. The output value is a desired value corresponding to the input value. In some embodiments, the printing system 300 uses a bias-variance tradeoff algorithm or a noise in the output values algorithm to train the machine learning system 306. In some embodiments, the printing system 300 uses a function complexity and amount of training data algorithm or dimensionality of the input values algorithm to train the machine learning system 306. In some embodiments, the printing system 300 uses a support vector machines algorithm or a linear regression algorithm to train the machine learning system 306. These techniques may be applied by the machine learning system 306 individually, in various combinations, or in combination with training of an artificial neural network, as described in more detail below.

The machine learning system 306 applies the training set of data to build the classifier 308. The machine learning system 306 applies the classifier 308 to generate pre-press operator action predictions 314 for the hand drawn flow chart 312 based on page parameters identified for the hand drawn flow chart 312 by the page parameter extractor. In some embodiments, the page parameter extractor is part of the machine learning system 306 and in others it is a separate logical component of the printing system 300. The page parameters may be represented as metadata associated with the document, such as page dimensions or page orientations, text page orientations, font sizes, or page tab annotations, or they may be derived by analyzing the content of the hand drawn flow chart 312. Additional examples of page parameters include word counts, text block locations, content areas, and content types identified in the hand drawn flow chart 312. Page parameters can also be page bookmarks and color modes used in the hand drawn flow chart 312, for example. Generally, the page parameters may be determined automatically by the page parameter extractor or provided to the machine learning system 306 manually by the pre-press operator, or by a combination of automated and manual input.

The machine learning system 306 correlates the page parameters to predictions for desirable pre-press operator actions on the hand drawn flow chart 312. The machine learning system 306 may for example correlate resizing and rotating the document pages or de-skewing pages or de-speckling pages or marking page holes with the determined page parameters, correlate page numbering or adding page tabs and page tab annotations with the determined page parameters, and/or correlate defining media and finishing properties with the determined page parameters.

In some embodiments, the pre-press operator then operates the pre-press operator machine interface 324 to select or deselect (or change) the predicted pre-press operator actions. Confirmations or changes are monitored by the pre-press action monitor and fed back to the machine learning system 306 to enhance the classifier 308. The classifier 308 may then be used to generate improved predictions and correlations in the future. For example, the machine learning system 306 may learn pre-press operator actions for certain sets of page parameters such as assigning the first and last two document pages to heavier page stock from the page stock bays 304, adding page tabs between concatenated files or document sections, adding page tab annotations before document pages with top-level bookmarks, assigning coated page stock to document pages with large images, or resizing document pages if the page size is above a pre-defined page size. For example, the machine learning system 306 may learn to resize pages larger than A4 to A3. Depending on the implementation, these learned associations may be particular to a person, organization, or work type in addition to being correlated to particular page parameters.

In other examples the machine learning system 306 may learn to predict the resizing or rotation or fitting of pages with certain font size or page orientations or page numbers, to predict resetting the page numbers at a file or section boundary, and/or to predict to not place the page numbers on pages with font sizes above a pre-defined font size.

As the machine learning system 306 receives more pre-press operator actions and pre-press operator decisions from the pre-press action monitor (which may be part of the pre-press operator machine interface 324 logic in some embodiments), the machine learning system 306 applies them to future predictions utilizing a training set 310 to iteratively adjust the classifier 308. In some embodiments, once an accuracy of a certain prediction reaches a pre-defined threshold, the printing system 300 adds the prediction to automatic actions that are automatically applied to the printer controller 316 and not subject to confirmation via the pre-press operator machine interface 324.

The machine learning system 306 may classify documents based on their content. For example, if a document is primarily text or tables or figures, as indicated by the page parameter extractor, it may be classified as a business document (e.g., annual report). This classification may lead to selection of a particular classifier 308. The machine learning system 306 may utilize and enhance different classification models for different document types, for different customers or customer types (e.g., real estate agents vs. university professors), or for combinations thereof.

The machine learning system 306 outputs pre-press operator action predictions 314 to the pre-press operator via the pre-press operator machine interface 324. Once confirmed or modified by the pre-press operator, the pre-press operator action predictions 314 are applied to the printer controller 316. The printer controller 316 applies the pre-press operator actions (e.g., selecting from the page stock bays 304 for particular sheets, adding page tabs, rotating or resizing certain pages etc.) to the printer 302 as control signals to print the hand drawn flow chart 312.

In some configurations, pre-press operator action predictions 314 may be communicated to the pre-press operator machine interface 324 via a router 322. The router 322 may also communicate the automated actions 326 from the machine learning system 306 to the printer controller 316.

Figure 4:
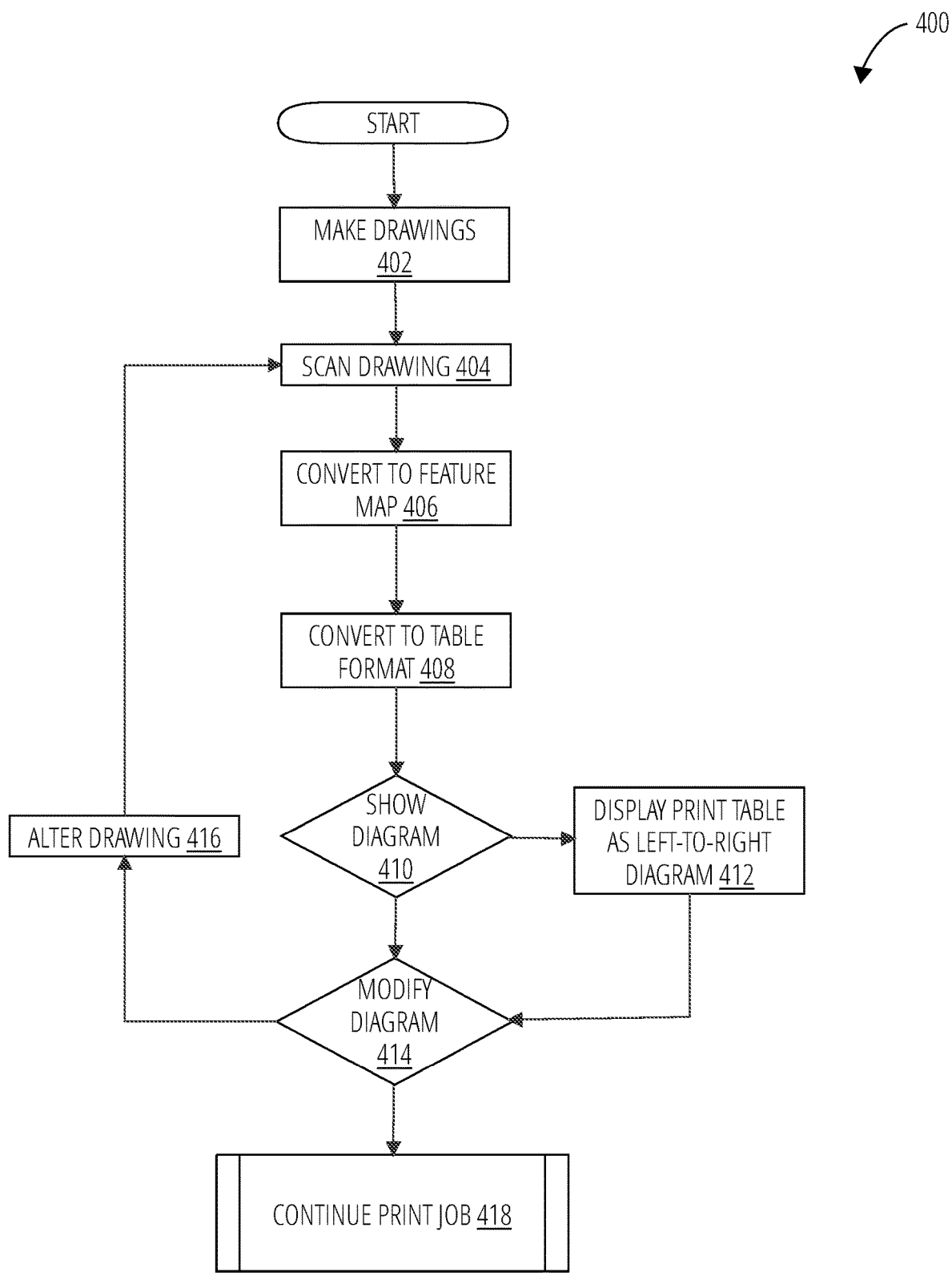
FIG. 4 illustrates a process 400 in accordance with one embodiment.

FIG. 4 illustrates an embodiment of the process 400 for operating the system 200 and the printing system 300. The process 400 begins in block 402 where an operator/user creates a hand drawn process flow. In block 404, the process 400 scans the hand drawn process flow using some image scanning apparatus. Block 406 corresponds to the machine learning step, in which the drawing is converted by some machine learning step into a feature map in which the different types of shapes, symbols, and connector lines are detected. Block 408 corresponds to the storage of the feature map in a table format, such as a connectivity matrix. Decision block 410 corresponds to displaying or printing the results of the feature map in a standardized linear way for user assessment. The process 400 may display the print table/feature map as a left to right diagram as per block 412.

In decision block 414, a user may decide to modify the drawing. In the case of rework being required, the user alters the original drawing using a prescribed notation (e.g., adding new shapes, adding new connectors, drawing clear X's on unwanted connectors, etc.) In block 416, annotations are performed on a printed version of the diagram, and the drawing is sent back to block 404 where it would repeat the process. If no modifications are required, the process 400 moves to subroutine block 418 where the process continues with the print job.

FIG. 5 illustrates CNN outputs 500 corresponding to a connectivity matrix 504 and a rectilinear graph 524. Following the detection and classification of the objects (decisions, actions, and connectors) in the hand drawn flow chart, a connectivity matrix 504 is generated describing the relationship between the different objects. The connectivity matrix 504 shows columns and rows with different actions arranged according to their connectivity.

The connectivity matrix 504 is utilized to generate a rectilinear graph 524 illustrating the flow between the different actions as nodes (action node 506, action node 508, action node 510, and action node 512) through the use of connectors 526 from a starting node (decision node 502). In the connectivity matrix 504, actions correspond to nodes in the rectilinear graph 524. For instance, the start action 514 corresponds to decision node 502, action 522 corresponds to action node 506, action 518 correspond to action node 512, action 520 corresponds to action node 508, and action 516 corresponds to action node 506. In the connectivity matrix 504, the process flow begins with a start action 514. In the row with the start action 514, the subsequent actions (action 516, action 520, and action 522) correspond to the order of the subsequent actions. Displayed in the rectilinear graph 524, the decision node 502 branches off to the action node 506, action node 508, and action node 510, with the connectors 526 identifying the order of subsequent actions from the start action 514. The second row in the connectivity matrix 504 shows the connection starting from action 522 leading to action 518 corresponding with the arrangement of action node 510 with action node 512. The third row shows that action 518 by itself as it is a terminal node for the process. In the fourth row, action 520 is followed by action 522 corresponding with the connection between action node 508 and the action node 510. In the fifth row, action 516 is followed by action 518 and corresponds to the connection seen between action node 506 and the action node 512.

FIG. 6 illustrates alternative outputs 600 for the rectilinear graph from the connectivity matrix 504. Alternate rectilinear graph 604 and alternate rectilinear graph 602 show different spatial positioning of the nodes and connectors from the rectilinear graph 524 but maintain the same connectivity.

In some configurations, the pseudo-code for converting a connectivity table into a rectilinear graph may begin with reading the connectivity table into a tree structure in memory, in which each destination node leading from some source node is treated as a child of that node. This may be followed by drawing the tree structure using Walker's Algorithm for drawing general trees.

The tree structure may have loop-backs, i.e., a child node of some node can be a node already existing in the tree. In the tree structure, the start node of the workflow may be utilized as the root node of the tree structure. Additionally, each node of the tree structure may have 1-N branches or leaves. Furthermore, any child of a node may be a pointer back to a node at the current level or some earlier level of the tree structure (i.e. loop-back).

When drawing the tree structure using Walker's Algorithm for drawing general trees, the algorithm may include some modifications. In one modification, the root orientation of the tree structure is set such that the tree structure grows from left to right. In another modification, when the nodes of the tree structure are initialized, their horizontal and vertical positions may be set only if they have not already been set. In another modification, the node connectors may be drawn from four different types of connectors a fork connector, a straight connector, a u-connector, or a c-connector. The various connectors will be mirrored vertically or horizontally in order to produce the fewest line crossings.

Figure 7:
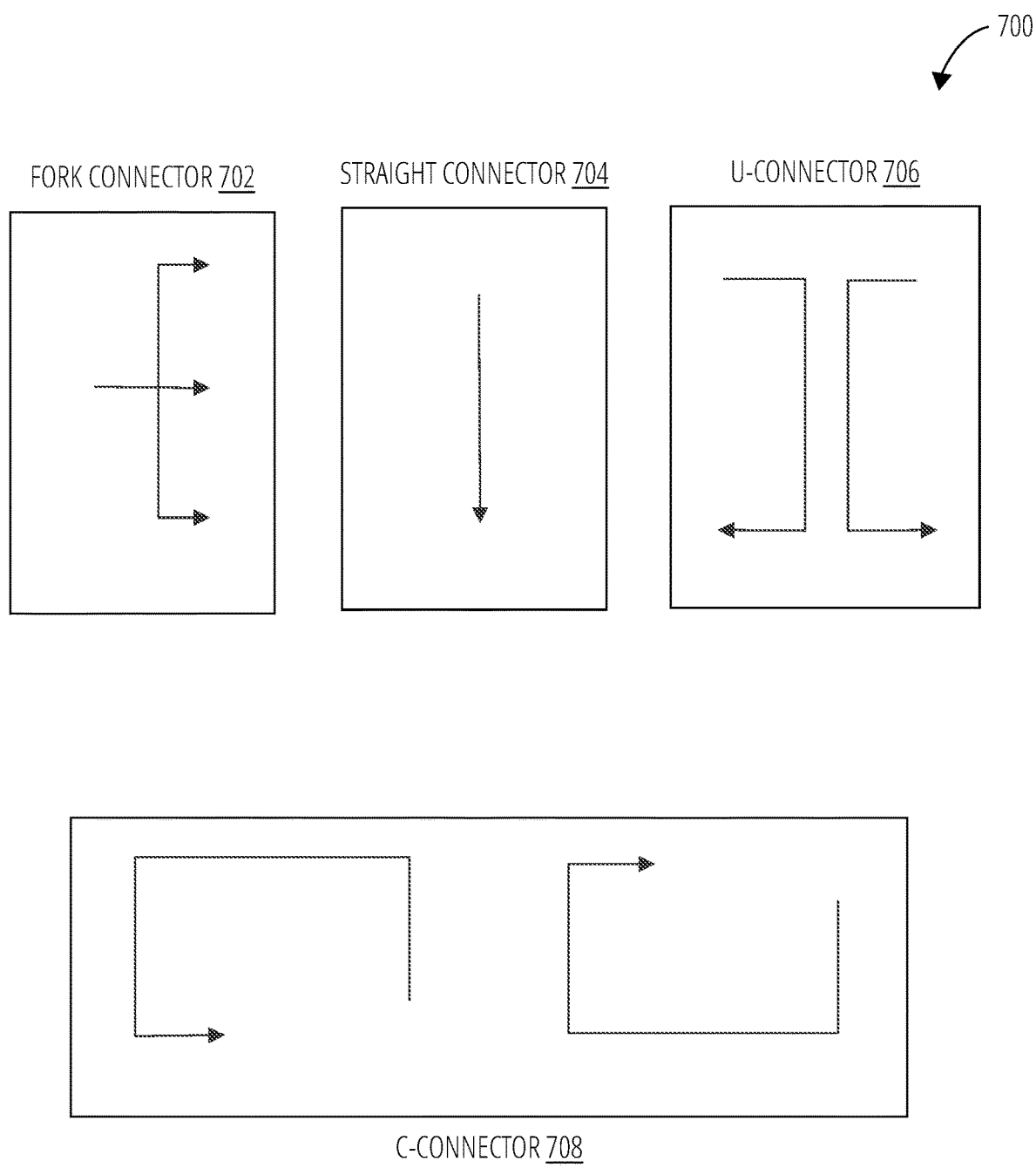
FIG. 7 illustrates connectors 700 in accordance with one embodiment.

FIG. 7 illustrates connectors 700 utilized in the rectilinear graph in accordance with one embodiment. A fork connector 702 may be utilized to connect parents to children. A straight connector 704 may be utilized to connect adjacent child nodes. A U-connector 706 may be utilized to connect non-adjacent child nodes. A C-connector 708 may be utilized to connect nodes to nodes at earlier levels.

Figure 8:
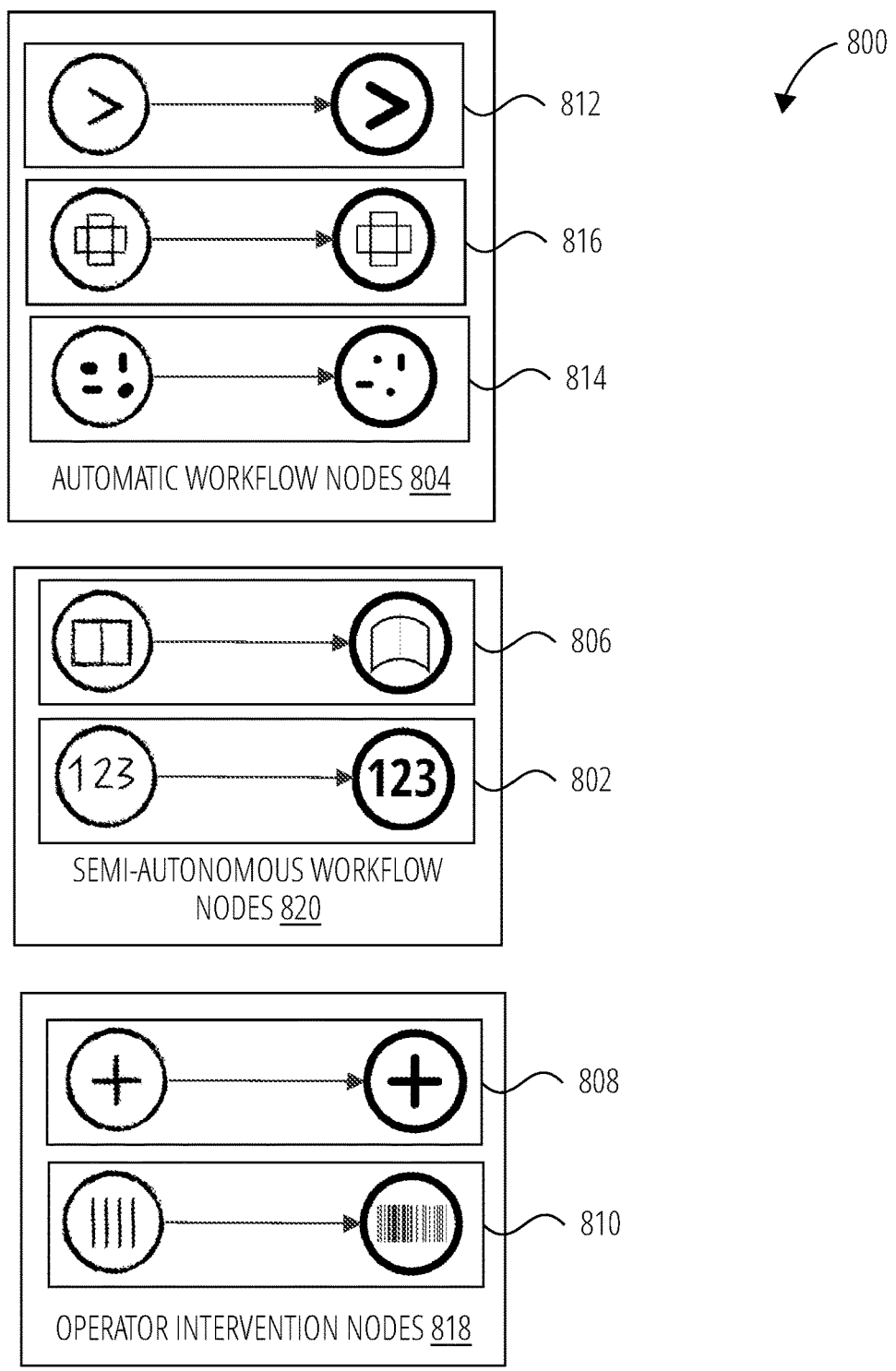
FIG. 8 illustrates action nodes 800 in accordance with one embodiment.

FIG. 8 illustrates action nodes 800 with icons depicts distinguishing different actions in the prepress workflow. The action nodes 800 may be categorized into automatic workflow nodes 804, semi-autonomous workflow nodes 820, and operator intervention nodes 818. Each of the nodes are shown paired with their hand drawn version and a displayed version in the rectilinear graph.

Some examples of workflow nodes which might be automatic (automatic workflow nodes 804) as opposed to those which might need operator intervention may include join/gang node 812 for combining multiple documents into one, Rotate/Convert Orientation node 816 for converting portrait to landscape or vice versa, and a De-Speckle node 814 to remove small spots, lines, etc. from scanned documents.

The semi-autonomous workflow nodes 820 are action nodes that may have default settings that would require no change once they are set.

These nodes may include an imposition node 806, which combines multiple pages on a sheet where the default would be "booklet" imposition, and a Page Number node 802, which add page numbers to pages, where the default would be plain decimal numbering starting at 1. Other semi-autonomous workflow nodes may include a Color Manage node to convert all content to a single output color space, where the default would be conversion of all content to CMYK, using the color profile of the current printer, and a Pressmark node that adds some marks such as color bars or registration marks to pages, where the default would be a color bar in CMYK, using the color profile of the current printer.

The operator intervention nodes 818 are nodes that may require the operators input to proceed. The operator intervention nodes 818 may include Insert Blank Sheets node 808 which may insert blank sheets somewhere in document and requires the number and position of inserted sheets and bar code nodes 810 which add a bar code to pages that may require the formatting and content of bar code to be selected.

Other possible operator intervention nodes may include a watermark node to add some image, text, or graphic, often semi-transparent, to pages and requiring the user to select the watermark. Another possible operator intervention node may include a Resize or Crop node to resize or crop pages specified by the operator.

FIG. 9 illustrates a flow diagrams 900 in accordance with one embodiment. The flow diagrams 900 include a hand drawn flow diagram 902 showing connections between a start node 912 and child node 908, child node 914, and child node 906. Child node 908 and child node 906 are special action nodes with icons indicating that 908 is a Page Number node, and child node 906 is a bar code node. In some configurations, if changes are needed in the hand drawn flow diagram 902, they can be made on the original drawing, which is rescanned and reconverted by the same automated process. Connections between nodes can be removed by drawing an annotation 910 such as an X, hatch lines, cross-hatch lines, or other annotation on them generating a modified hand drawn flow diagram 904 that is then rescanned. The machine learning system may be trained to recognize these annotations and update the process.

Figure 10:
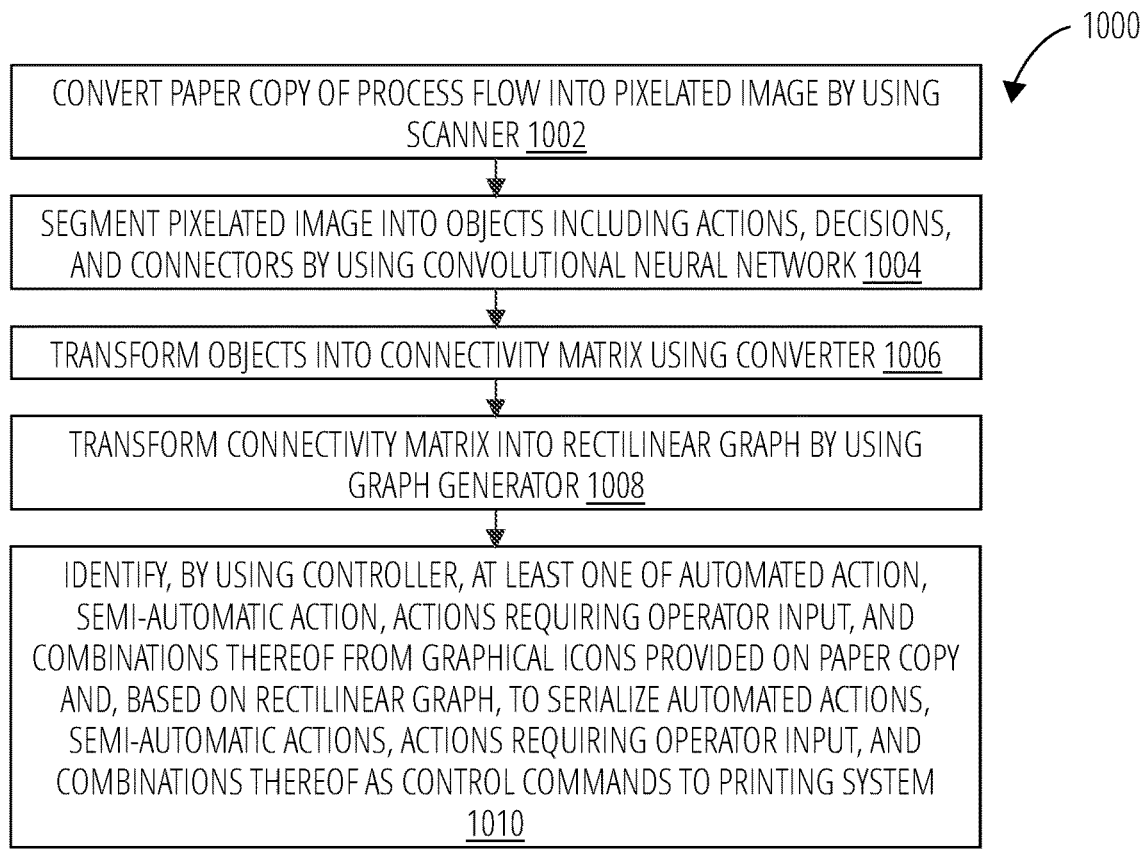
FIG. 10 illustrates a flowchart of a method 1000 in accordance with one embodiment.

Referring to FIG. 10, in an exemplary embodiment, a method 1000 converts a paper copy of a process flow into a pixelated image by using a scanner (block 1002). In block 1004, the method 1000 segments the pixelated image into objects including at least one of an action, a decision, a connector, or combinations thereof, by using a convolutional neural network. Next, the method 1000 transforms the objects into a connectivity matrix using a converter (block 1006). In block 1008, the method 1000 transforms the connectivity matrix into a rectilinear graph by using a graph generator. Finally, the method 1000 identifies, by using a controller, at least one of an automated action, a semi-automatic action, an action requiring operator input, and combinations thereof from graphical icons provided on the paper copy and, based on the rectilinear graph, to serialize automated actions, semi-automatic actions, actions requiring operator input, and combinations thereof as control commands to a printing system (block 1010).

Figure 11:
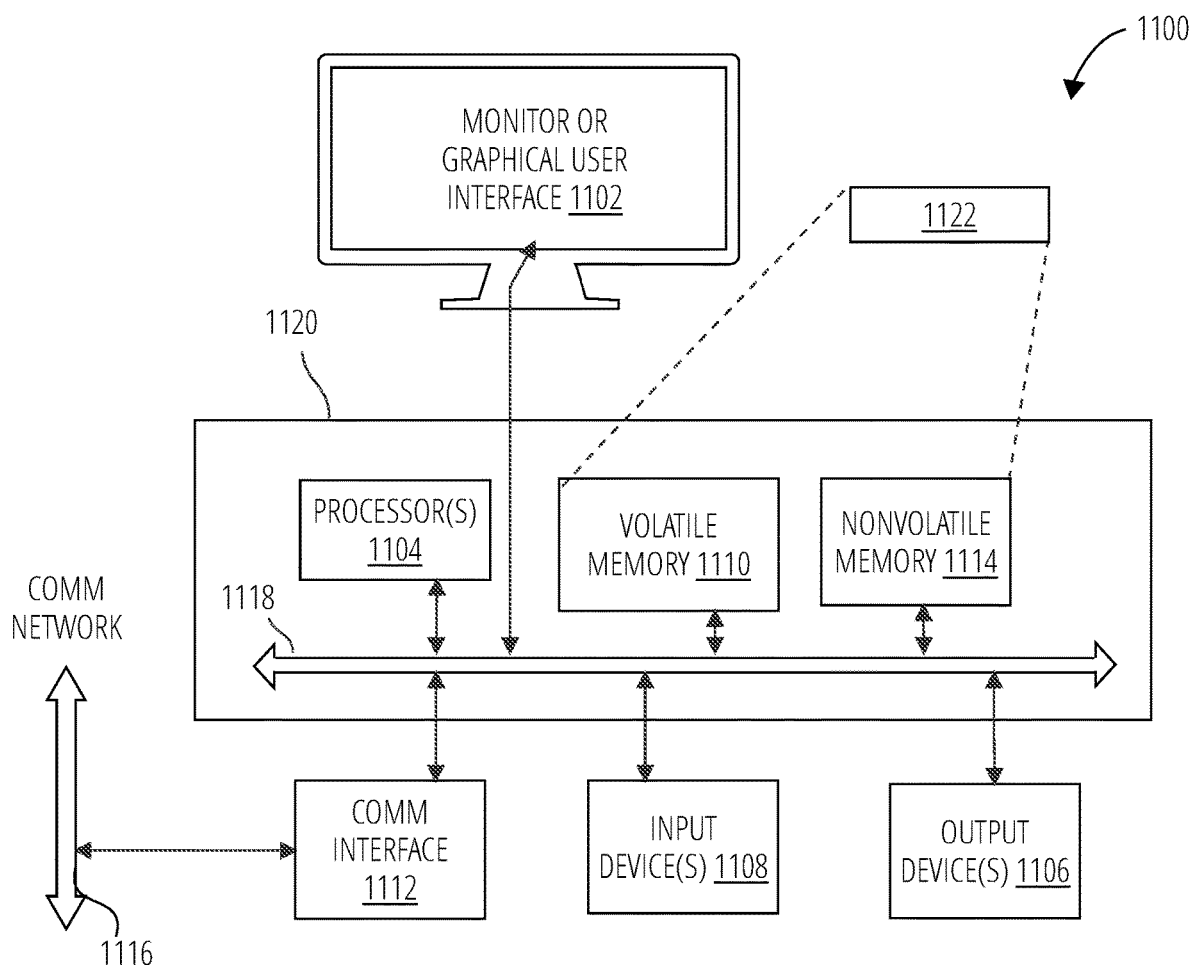
FIG. 11 is an example block diagram of a computing device 1100 that may incorporate embodiments of the present invention.

FIG. 11 is an example block diagram of a computing device 1100 that may incorporate embodiments of the present invention. FIG. 11 is merely illustrative of a machine system to carry out aspects of the technical processes described herein and does not limit the scope of the claims. One of ordinary skill in the art would recognize other variations, modifications, and alternatives. In one embodiment, the computing device 1100 typically includes a monitor or graphical user interface 1102, a data processing system 1120, a communication network interface 1112, input device(s) 1108, output device(s) 1106, and the like.

As depicted in FIG. 11, the data processing system 1120 may include one or more processor(s) 1104 that communicate with a number of peripheral devices via a bus subsystem 1118. These peripheral devices may include input device(s) 1108, output device(s) 1106, communication network interface 1112, and a storage subsystem, such as a volatile memory 1110 and a nonvolatile memory 1114.

The volatile memory 1110 and/or the nonvolatile memory 1114 may store computer-executable instructions and thus forming logic 1122 that when applied to and executed by the processor(s) 1104 implement embodiments of the processes disclosed herein.

The input device(s) 1108 include devices and mechanisms for inputting information to the data processing system 1120. These may include a keyboard, a keypad, a touch screen incorporated into the monitor or graphical user interface 1102, audio input devices such as voice recognition systems, microphones, and other types of input devices. In various embodiments, the input device(s) 1108 may be embodied as a computer mouse, a trackball, a track pad, a joystick, wireless remote, drawing tablet, voice command system, eye tracking system, and the like. The input device (s) 1108 typically allow a user to select objects, icons, control areas, text and the like that appear on the monitor or graphical user interface 1102 via a command such as a click of a button or the like.

The output device(s) 1106 include devices and mechanisms for outputting information from the data processing system 1120. These may include the monitor or graphical user interface 1102, speakers, printers, infrared LEDs, and so on as well understood in the art.

The communication network interface 1112 provides an interface to communication networks (e.g., communication network 1116) and devices external to the data processing system 1120. The communication network interface 1112 may serve as an interface for receiving data from and transmitting data to other systems. Embodiments of the communication network interface 1112 may include an Ethernet interface, a modem (telephone, satellite, cable, ISDN), (asynchronous) digital subscriber line (DSL), FireWire, USB, a wireless communication interface such as Bluetooth or Wi-Fi, a near field communication wireless interface, a cellular interface, and the like.

The communication network interface 1112 may be coupled to the communication network 1116 via an antenna, a cable, or the like. In some embodiments, the communication network interface 1112 may be physically integrated on a circuit board of the data processing system 1120, or in some cases may be implemented in software or firmware, such as "soft modems", or the like.

The computing device 1100 may include logic that enables communications over a network using protocols such as HTTP, TCP/IP, RTP/RTSP, IPX, UDP and the like.

The volatile memory 1110 and the nonvolatile memory 1114 are examples of tangible media configured to store computer readable data and instructions to implement various embodiments of the processes described herein. Other types of tangible media include removable memory (e.g., pluggable USB memory devices, mobile device SIM cards), optical storage media such as CD-ROMS, DVDs, semiconductor memories such as flash memories, non-transitory read-only-memories (ROMS), battery-backed volatile memories, networked storage devices, and the like. The volatile memory 1110 and the nonvolatile memory 1114 may be configured to store the basic programming and data constructs that provide the functionality of the disclosed processes and other embodiments thereof that fall within the scope of the present invention.

Logic 1122 that implements embodiments of the present invention may be stored in the volatile memory 1110 and/or the nonvolatile memory 1114. Said logic 1122 may be read from the volatile memory 1110 and/or nonvolatile memory 1114 and executed by the processor(s) 1104. The volatile memory 1110 and the nonvolatile memory 1114 may also provide a repository for storing data used by the logic 1122.

The volatile memory 1110 and the nonvolatile memory 1114 may include a number of memories including a main random access memory (RAM) for storage of instructions and data during program execution and a read only memory (ROM) in which read-only non-transitory instructions are stored. The volatile memory 1110 and the nonvolatile memory 1114 may include a file storage subsystem providing persistent (non-volatile) storage for program and data files. The volatile memory 1110 and the nonvolatile memory 1114 may include removable storage systems, such as removable flash memory.

The bus subsystem 1118 provides a mechanism for enabling the various components and subsystems of data processing system 1120 communicate with each other as intended. Although the communication network interface 1112 is depicted schematically as a single bus, some embodiments of the bus subsystem 1118 may utilize multiple distinct busses.

It will be readily apparent to one of ordinary skill in the art that the computing device 1100 may be a device such as a smartphone, a desktop computer, a laptop computer, a rack-mounted computer system, a computer server, or a tablet computer device. As commonly known in the art, the computing device 1100 may be implemented as a collection of multiple networked computing devices. Further, the computing device 1100 will typically include operating system logic (not illustrated) the types and nature of which are well known in the art.

The methods and systems in this disclosure are described in the preceding on the basis of several preferred embodiments. Different aspects of different variants are considered to be described in combination with each other such that all combinations that upon reading by a skilled person in the field on the basis of this document may be regarded as being read within the concept of the invention. The preferred embodiments do not limit the extent of protection of this document.

Having thus described embodiments of the present invention of the present application in detail and by reference to illustrative embodiments thereof, it will be apparent that modifications and variations are possible without departing from the scope of the present invention.

What is claimed is:

1. A system comprising:
    a scanner to convert a paper copy of a process flow into a pixelated image;
    a convolutional neural network configured to segment the pixelated image into objects including at least one of an action, a decision, a connector, or combinations thereof;
    a converter to transform the objects into a connectivity matrix;
    a graph generator to transform the connectivity matrix into a rectilinear graph; and
    a controller to identify automated actions, semi-automatic actions, and actions requiring operator input from graphical icons provided on the paper copy and, based on the rectilinear graph, to serialize the automated actions, the semi-automatic actions, and the actions requiring operator input as control commands to a printing system.

2. The system of claim 1, further comprising:
    a router to direct actions requiring operator input from the rectilinear graph to an operator console.

3. The system of claim 1, further comprising a feedback loop from the printing system to the scanner.

4. The system of claim 1, the convolutional neural network further configured to recognize annotations on the paper copy to remove connectors.

5. The system of claim 4, wherein the annotations on the paper copy to remove the connectors are at least one or more of an X, hatch lines, and cross-hatch lines through the connectors.

6. The system of claim 1, wherein the automated actions include at least one or more of joining multiple documents into one document, ganging multiple documents into one document, rotating a page orientation, converting the page orientation, and de-speckling a scanned document.

7. The system of claim 1, wherein the actions requiring operator input include at least one or more of adding a watermark, inserting blank sheets, adding a bar code, resizing pages, and cropping pages.

8. The system of claim 1, wherein the semi-automatic actions include imposing multiple pages, color managing pages, adding page numbers, and pressmarking pages.

9. The system of claim 1, wherein the rectilinear graph includes a tree structure with parent nodes and child nodes, the tree structure grows from left to right, and when the nodes of the tree structure are initialized, their horizontal and vertical positions are set only if they have not been previously set.

10. The system of claim 9, wherein node connectors of the rectilinear graph include at least one or more of fork connectors to connect parent nodes to child nodes, straight connectors to connect adjacent child nodes, U-connectors to connect non-adjacent child nodes, and C-connectors to connect nodes requiring a loop-back connection.

11. A method comprising:
    converting a paper copy of a process flow into a pixelated image by using a scanner;
    segmenting the pixelated image into objects including at least one of an action, a decision, connector, or a combination thereof, by using a convolutional neural network;
    transforming the objects into a connectivity matrix using a converter;
    transforming the connectivity matrix into a rectilinear graph by using a graph generator; and
    identifying, by using a controller, automated actions, semi-automatic actions, and actions requiring operator input, from graphical icons provided on the paper copy and, based on the rectilinear graph to serialize automated actions, semi-automatic actions, actions requiring operator input, and combinations thereof as control commands to a printing system.

12. The method of claim 11, further comprising directing the actions requiring operator input from the rectilinear graph to an operator console by using a router.

13. The method of claim 11, further comprising updating the scanner using a feedback loop from the printing system.

14. The method of claim 11, further comprising configuring the convolutional neural network to recognize annotations on the paper copy to remove the connectors.

15. The method of claim 14, wherein the annotations on the paper copy to remove the connectors are at least one or more of an X, hatch lines, and cross-hatch lines through the connectors.

16. The method of claim 11, wherein the automated actions include at least one or more of joining multiple documents into one document, ganging multiple documents into one document, rotating a page orientation, converting the page orientation, and de-speckling a scanned document.

17. The method of claim 11, wherein the actions requiring operator input include at least one or more of adding a watermark, inserting blank sheets, adding a bar code, resizing pages, and cropping pages.

18. The method of claim 11, wherein the semi-automatic actions include imposing multiple pages, color managing pages, adding page numbers, and pressmarking pages.

19. The method of claim 11, wherein the rectilinear graph includes a tree structure with parent nodes and child nodes, the tree structure grows from left to right, and when the nodes of the tree structure are initialized, their horizontal and vertical positions are set only if they have not been previously set.

20. The method of claim 19, wherein node connectors of the rectilinear graph include at least one or more of fork connectors to connect parent nodes to child nodes, straight connectors to connect adjacent child nodes, U-connectors to connect non-adjacent child nodes, and C-connectors to connect nodes requiring a loop-back connection.

\* \* \* \* \*